July 9, 1929.  R. R. ENTWISTLE ET AL  1,720,037
GRIP FOR FISH TAPE
Filed Dec. 6, 1927
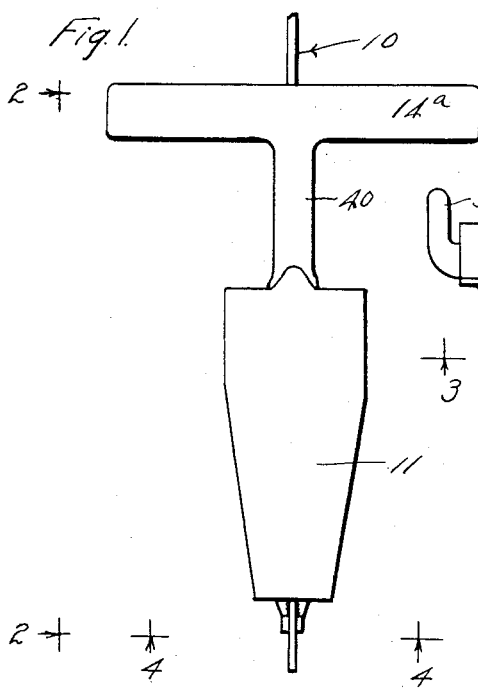
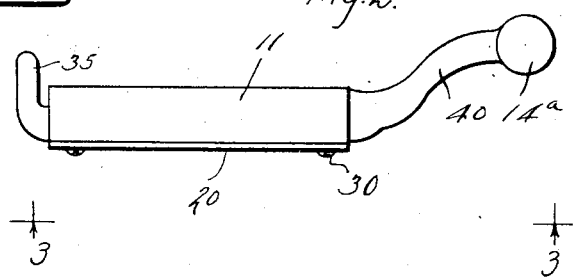
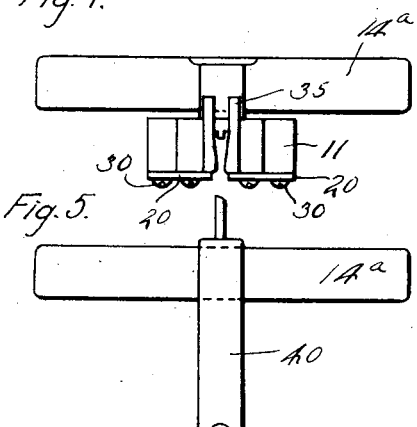
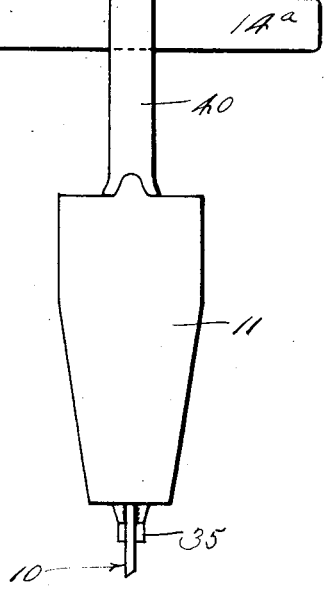
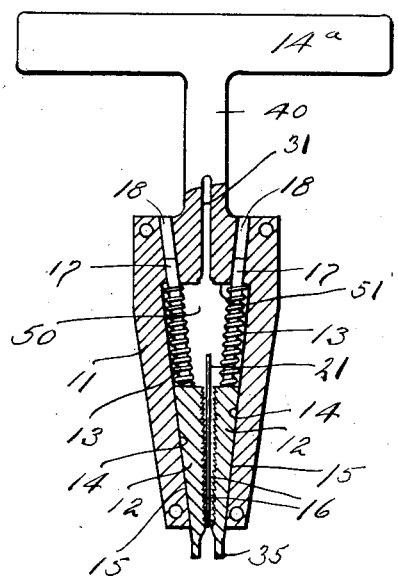
Inventors
Raymond R. Entwistle
and
William J. Geist
by
Their Attorney Patented July 9, 1929.

1,720,037

UNITED STATES PATENT OFFICE.

RAYMOND R. ENTWISTLE AND WILLIAM J. GEIST, OF LONG BEACH, CALIFORNIA.

GRIP FOR FISH TAPE.

Application filed December 6, 1927. Serial No. 238,184.

This invention has to do with a grip for fish tape, and it is an object of the invention to provide a device whereby a fish tape, that is, a tape of steel, or the like, used in threading wires through conduits, can be conveniently and effectively engaged in order to draw it through a conduit.

It is customary in making ordinary electrical installations to string the wires through metal conduits or pipes. In practice, the desired system of conduits is installed after which the wires are strung through them by means of steel tape, commonly known as fish tape. The steel tape is first threaded through the conduit and is drawn out through the desired outlet opening with the wire attached to its trailing end. In practice, difficulty is experienced in obtaining the desired grip on the steel tape, and it is customary to use pliers in order to get a grip on the tape. It is obvious, of course, that the use of pliers is more or less unsatisfactory, as it does not provide a convenient or advantageous grip on the tape and sometimes results in injury to the tape.

It is an object of this invention to provide a grip for fish tape, such as is mentioned above, whereby the tape can be engaged at any desired point, giving the operator an advantageous grip on the tape.

It is another object of this invention to provide a grip of the type mentioned which can be advanced or moved along a steel fish tape as the tape is withdrawn and without disengaging it from the tape.

It is another object of this invention to provide a grip of the character mentioned which is simple and inexpensive of construction and which presents a handle that can be conveniently and effectively gripped by the operator.

The various objects and features of the invention will be best and more fully understood from the following detailed description of the invention, throughout which description reference is had to the accompanying drawings, in which:

Fig. 1 is a top or plan view of the grip provided by this invention, showing it in position on a typical steel fish tape;

Fig. 2 is a side elevation of the device shown in Fig. 1, being a view taken as indicated by line 2—2 on Fig. 1;

Fig. 3 is a view of the device showing certain parts broken away;

Fig. 4 is an end elevation of the device, being a view taken as indicated by line 4—4 on Fig. 1; and Fig. 5 is a view similar to Fig. 1, showing a modified form of construction.

The grip provided by this invention is designed primarily to handle steel fish tape of the type used in fishing wires through conduits, etc. In the drawings, we have disclosed a typical preferred form of the invention constructed to handle a typical and common form of steel fish tape. The fish tape 10, illustrated in the drawings, is rectangular in cross sectional configuration and of about the usual proportioning.

The grip provided by this invention includes, generally, a body 11, slip jaws 12 mounted in the body, springs 13 normally urging the jaws to cause them to grip the tape, a handle 14ª attached to the forward end of the body, and various other parts, the details and functions of which will be hereinafter described.

The body 11 has a recess 50 in its lower side to carry the slip jaws 12, the recess being formed so that its side walls 14 are straight and converge from the forward part of the body to the rear end of the body. In the preferred construction, the recess is formed in the body so that it extends to the rear end of the body, allowing the slips to project therefrom. The convergent side walls 14 of the recess are symmetrically disposed with reference to the central longitudinal axis of the device, as clearly illustrated in Fig. 3 of the drawings.

The slip jaws 12 are mounted in the body to slidably engage the side walls 14. The backs 15 of the jaws are finished to slidably engage the walls 14, while the front faces 16 are finished to grip the tape 10 and are formed so that they are parallel with the tape, as shown in Fig. 3 of the drawings. The slip jaws are held or guided in the proper manner with reference to the walls 14 by stems 17 projecting from the large ends of the jaws to slidably fit openings 18 in the forward end portion of the body, by plates 20 applied to the lower side of the body, and by a central rib 21 on the bottom of the recess. The stems 17 project from the large end of the slip jaws 12 and extend parallel with the walls 14 to slidably fit the openings 18 formed in the forward end portion of the body parallel with the walls 14. The plates 20 are secured to the lower side of the body by means of screws 30, or the like. The inner or adjacent edges of the plates 20 are spaced apart and form a longitudinal opening to admit the tape 10 into the body to be engaged by the slip jaws 12. The forward end of the body 11 is provided with a slot or opening 31 in line with the opening or space between the plates 20 and sufficiently deep to allow proper insertion of the tape 10 into place between the slip jaws. The rib 21 on the bottom of the recess 50 is centrally disposed and projects between the jaws to limit their closing or inward movement. The rib 21 acts as a stop which normally holds the slip jaws slightly open so that the tape 10 can be readily inserted between them.

In the preferred construction, the small or narrow ends of the slip jaws may project slightly from the rear end of the body, and suitable extensions 35 may be provided on the projecting ends of the jaws so that the jaws can be conveniently and simultaneously operated against the resistance of the springs 13. The extensions 35 may be designed to project somewhat above the body so that they can be easily engaged by the operator.

The springs 13, provided for normally urging the slip jaws into operation, may be helical springs carried on the stems 17 under compression between the forward end 51 of the recess 50 and the large end of the slip jaws.

The handle 14ᵃ is disposed transversely of the body 11 and is located somewhat above the body so that it can be conveniently gripped by the operator to give the operator an effective purchase on the tape 10 held in the device. A suitable neck or connecting part 40 connects the handle 14ᵃ with the forward end of the body 11 and is shaped to support the handle in the desired position with reference to the body. In the preferred construction, the body, neck and handle are formed integrally, as shown in Figs. 1, 2 and 3 of the drawings, making a simple, strong construction. The handle may be formed separately as shown in Fig. 5.

In using the grip provided by our invention, it is applied to a fish tape 10 by spreading or releasing the slip jaws to allow the insertion of the tape between them. When the tape is between the jaws, the springs 13 operate to hold the jaws in gripping engagement with the tape and, as the operator pulls on the handle, the jaws are further wedged into gripping engagement with the tape. The gripping faces 16 of the jaws, when thus forced or set against the tape, are positive in preventing slippage of the device along the tape. It will be apparent, however, that the jaws readily release the tape when the operator pushes the device in the direction opposite to which the tape is being pulled.

Through this releasing operation, the device can be slid along the tape as the tape is withdrawn from the conduit, the springs 13 assuring an effective grip on the tape whenever the tool is pulled in a direction to withdraw the tape from the conduit.

Having described only a preferred form of our invention, we do not wish to limit ourselves to the specific details set forth, but wish to reserve to ourselves any changes or variations that may appear to those skilled in the art or fall within the scope of the following claims.

Having described our invention, we claim:

1. A grip for fish tape including a body having an opening to admit the tape, a handle in connection with the body, and slip jaws mounted in the body to grip the tape, the jaws having parts projecting from the body through said opening whereby they can be operated.

2. A grip for fish tape including a body having a recess in one side for receiving the tape, the recess having convergent side walls, slip jaws arranged in the recess slidably engaging the side walls, the jaws being operable to grip the tape at the recess, and plates attached to said side of the body retaining the jaws in the recess.

3. A grip for fish tape including a body having a recess in one side, the recess having convergent side walls, slip jaws arranged in the recess engaging the side walls, the jaws being operable to grip the tape, stems on the jaws slidably fitting openings in the body, and plates attached to said side of the body retaining the jaws in the recess.

4. A grip for fish tape including a body having a recess in its lower side and having a longitudinal opening to admit the tape into the recess, the recess having convergent side walls, a neck projecting from the body, a handle carried by the neck, slip jaws arranged in the recess in sliding engagement with the side walls, stems on the jaws slidably fitting guide openings in the body, springs carried on the stems normally yieldingly holding the jaws in operating position, plates attached to said side of the body to retain the jaws in the recess, and parts projecting from the jaws to the exterior of the body.

5. A grip of the character described including a body having an opening to receive the object to be gripped, slip jaws mounted in the body to grip the object, and lateral projections on the jaws projecting beyond the body.

6. A grip for fish tape including a body having an opening to admit the tape, a handle in connection with the body, and slip jaws mounted in the body to grip the tape, the jaws having parts projecting from the body through said opening whereby they can be operated, said parts having laterally projecting portions at the exterior of the body.

In witness that we claim the foregoing we have hereunto subscribed our names this 18th day of November, 1927.

RAYMOND R. ENTWISTLE.
WILLIAM J. GEIST.